Aug. 8, 1967        A. DI SETTEMBRINI        3,334,380
DEVICE FOR ADJUSTING THE OPENING AND CLOSING
MOVEMENT OF THE MOLDS OF A MACHINE FOR
MANUFACTURING PLASTIC CONTAINERS
Filed Oct. 6, 1964                                2 Sheets-Sheet 2
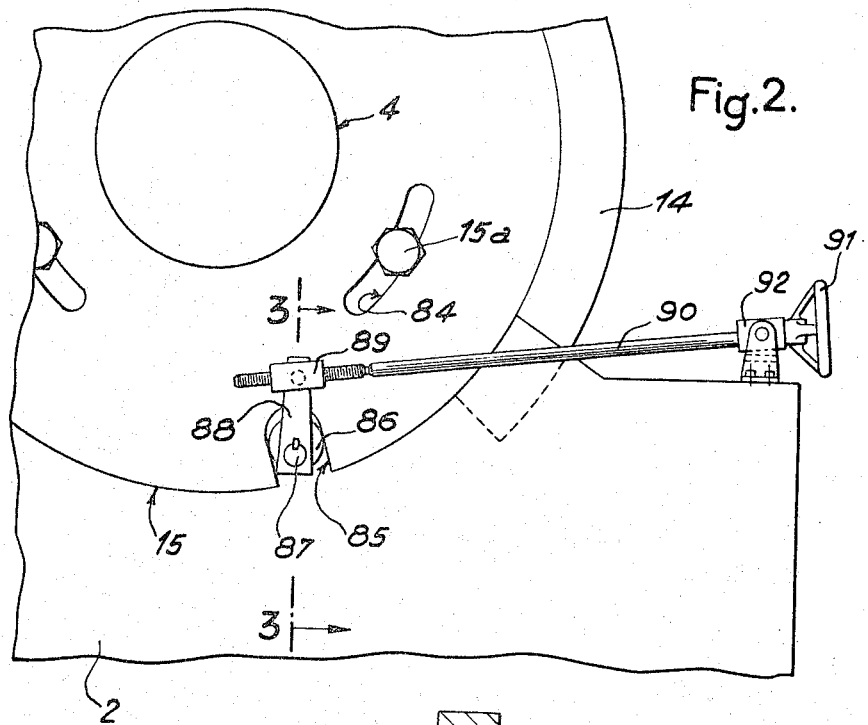
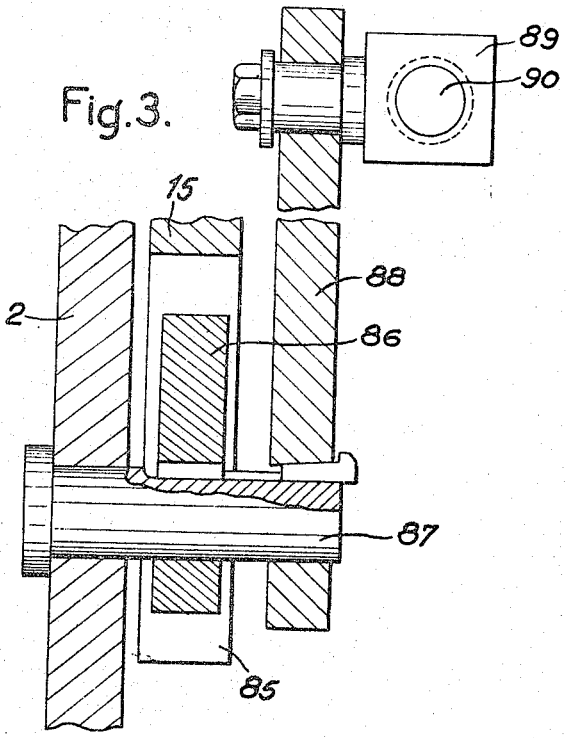

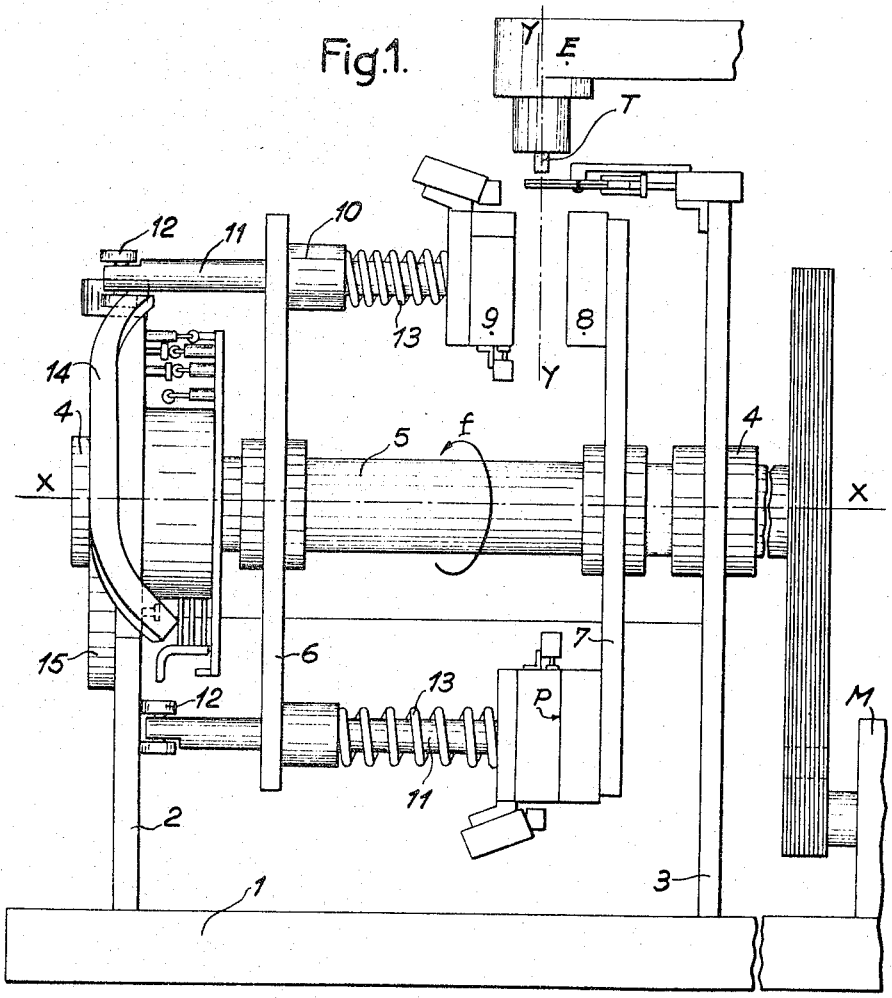

United States Patent Office 3,334,380
Patented Aug. 8, 1967

3,334,380
DEVICE FOR ADJUSTING THE OPENING AND CLOSING MOVEMENT OF THE MOLDS OF A MACHINE FOR MANUFACTURING PLASTIC CONTAINERS
Antoine Di Settembrini, 42 Residence du Petit Val, Sucy-en-Brie, France
Filed Oct. 6, 1964, Ser. No. 401,875
Claims priority, application France, Nov. 21, 1963, 954,541, Patent 1,392,517; 1st addition, July 10, 1964, 981,455
3 Claims. (Cl. 18—5)

ABSTRACT OF THE DISCLOSURE

Machine for molding bottles of thermoplastic material by extrusion and blowing, which comprises a plurality of molds disposed at spaced angular intervals on a rotating support about its axis of rotation, each mold comprising a fixed half-mold carried by said support and a movable half-mold, a plurality of arms parallel to said axis of rotation of said support, each arm carrying at one end a movable half-mold, roller followers mounted on the opposite ends of said arms, a circular cam coaxial to said axis of rotation of said support, spring means for resiliently urging said roller followers of said arms against said circular cam, a plate rotatably mounted on the frame structure about said axis of rotation of said mold support, said circular cam being secured on said plate for controlling the mold opening and closing movements, and means for adjusting the angular position of said cam supporting plate during the operation of the machine.

---

This invention relates to the manufacture of plastic containers and has specific reference to a machine designed for manufacturing plastic bottles.

This machine pertains to the known type wherein a number of molds are conveyed continuously past an extruder producing a tubular blank or parison of plastic material. Each mold is re-closed in succession on a parison section and the latter is subjected within the mold to an expansion by internal blowing so as to take the exact shape of the mold impression which corresponds to that of the desired bottle. Subsequent to this shaping step and after a sufficient cooling time the mold is opened to permit the stripping and release of the shaped bottle, and the same cycle is resumed with a fresh mold.

The present invention has essentially for its object the provision of a device for adjusting the mold opening and closing movements.

Another object of this invention is to provide a device capable of adjusting the mold opening and closing movements during the operation of the machine, that is, without having to stop same.

Other features and advantages of this invention will appear as the following description proceeds with reference to the accompanying diagrammatic drawings in which:

FIGURE 1 is a diagrammatic elevational view showing a typical form of embodiment of a machine constructed according to the teachings of this invention;

FIGURE 2 is a fragmentary elevational view showing a modified form of embodiment of the cam-plate adjustment device;

FIGURE 3 is a section taken upon the line 3—3 of FIGURE 2.

The machine according to this invention comprises a frame structure consisting essentially of a base plate or bed 1 and a pair of parallel vertical side flanges 2, 3. These flanges carry bearings 4 in which a main shaft 5 is journalled for rotation about the axis XX; this shaft 5 is driven continuously in the direction of the arrow $f$ from a motor and variator unit M through adequate belt and pulley transmission means.

The extruder unit E shown only in very diagrammatic form in the drawing is carried by the aforesaid frame structure. The extrusion head is disposed according to a vertical axis YY intersecting the axis XX of shaft 5 and therefore extends radially thereto. This extruder E produces a tubular blank of parison T for example of rigid polyvinyl chloride.

The machine comprises furthermore a rotary mold support, the molding impressions or cavities of these molds having the shape and dimensions of the bottles to be manufactured. This support may assume substantially the shape of a rotary drum.

The rotary mold support mounted on shaft 5 consists of a pair of parallel vertical circular plates 6, 7 rigid with shaft 5 and carrying metal molds. In this example the support carries six molds, but it is clear that this number is not critical. The molds disposed at spaced annular intervals at the outer periphery of the plates consist of two portions or mold halves, that is, a fixed half-mold 8 and a movable half-mold 9, these half-molds being separated from each other by a vertical joint plane P. Plate 7 carries the fixed half-molds 8 secured thereon (on the side of the extruder E) and plate 6 carries the movable half-molds 9 but so mounted as to be movable in a direction parallel to the shaft axis XX. To this end the plate 6 carries on its outer peripheral portion as many sockets 10 as there are molds in the machine. These sockets register with the fixed half-molds 8. Each socket 10 has slidably mounted therein a rod 11 carrying at one end the corresponding movable half-mold 9 and at the opposite end a pair of rollers 12 engaging a cam face of the mold opening and closing mechanism to be described presently. Each movable half-mold 9 is resiliently urged to its closed position, that is, in engagement with the corresponding fixed half-mold, by a return coil spring 13 surrounding the rod 11 and reacting between the movable half-mold 9 and the relevant socket 10, as shown.

The movement of translation parallel to the axis XX which is thus imparted to the movable mold halves 9 for opening and closing the molds is obtained by using mechanical means comprising a cam member 14 carried by an annular plate 15 concentric with the axis XX and secured by screws 15a on the lateral flange 2 of the frame structure of the machine.

The position of plate 15 carrying the half-mold opening cam face 14 may be altered with a view to adjust more accurately the time at which the mold opening movement takes place. In the example described hereinabove the holes 84 formed in the plate and receiving the bolts 15a are elongated or arcuate; thus, the adjustment is effected by loosening these bolts 15a and rotating more or less the plate 15, whereafter the screws 15a are re-tightened and locked in the selected adjustment position. However, with this arrangement the adjustment cannot be effected during the operation of the machine.

With the alternate form of embodiment illustrated in FIGURES 2 and 3 the adjustment may be carried out without stopping the machine. The bolts 15a are not tightened or locked, so as to permit a certain free angular movement of the plate within the limits afforded by the arcuate holes 84. In addition, the plate 15 comprises a peripheral notch 85 pivotally engaged by an eccentric roller 86 mounted on a pin 87 extending through the stationary flange 2 of the machine frame structure; this pin 87 is solid with a lever 88 carrying on its end opposite the flange 2 a nut 89 engaged by a screw-threaded rod 90 adapted to be rotated by means of a handwheel 91 and mounted in a swivelling bearing carried by the frame 2. By rotating this handwheel 91 the operator may move the lever 88 and thus rotate the eccentric roller in order to move the plate 15. This device permits the proper angular positioning of the cam 14 even during the operation of the machine.

Although the specific forms of embodiment shown and described herein refer to a six-mold machine wherein the molds are disposed at spaced intervals on a concentric rotary plate, it is obvious for anybody conversant with the art that this invention is also applicable to a machine comprising a different number of molds as consistent with the desired production rate and the dimensional characteristics of the plate, and also with the operation of the extruder.

Finally, the machine of this invention is also suitable for use in the manufacture of bottles of any desired thermoplastic material, whether organic or inorganic, that is, any material adapted to soften in a reversible manner under the action of heat.

What I claim is:

1. Machine for molding bottles of thermoplastic material by extrusion and blowing, which comprises a frame structure, a support rotatably mounted on said frame structure for rotation about an axis, means for rotatably driving said support continuously, a plurality of molds disposed at spaced angular intervals on said support about said axis of rotation, each mold comprising a fixed half-mold carried by said support and a movable half-mold displaceable on said support in a direction parallel to said axis of rotation, a plurality of arms parallel to said axis of rotation of said support, each arm carrying at one end a movable half-mold, roller followers mounted on the opposite ends of said arms, a circular cam coaxial to said axis of rotation of said support, spring means for resiliently urging said roller followers of said arms against said circular cam, whereby said circular cam is adapted to control the opening and closing of said molds during the rotation of said support, a plate rotatably mounted on said frame structure about said axis of rotation of said mold support, said circular cam being secured on said plate for controlling the mold opening and closing movements, and means for adjusting the angular position of said cam-supporting plate during the operation of the machine.

2. Machine as set forth in claim 1, which comprises a frame flange extending at right angles to the axis of rotation of said mold support, elongated holes formed through said circular-cam carrying plate concentrically to said axis of rotation of said mold support, screws extending through said elongated holes and engaging said flange with a view to permit a relative angular movement of a certain amplitude between said plate and said flange, a peripheral notch formed in said plate, an eccentric roller engaging said notch, a pivot pin carried by said flange, said eccentric roller being mounted on said pivot pin, and remote control means adapted to rotate said pivot pin and said eccentric roller with a view to produce an angular shifting of said plate carrying said circular cam.

3. Machine as set forth in claim 2, wherein said means controlling the rotation of said eccentric roller comprise a lever rigid with said pivot pin, a nut pivoted on said lever, a screw-threaded rod engaging said nut, a bearing pivotally mounted on the frame structure of the machine and supporting said screw-threaded rod, and a control member mounted on the end of said rod.

References Cited

UNITED STATES PATENTS 2,784,452   3/1957   Ruekberg et al. _____ 18—5

FOREIGN PATENTS 1,244,247   9/1960   France.

J. SPENCER OVERHOLSER, *Primary Examiner.*

W. L. McBAY, *Assistant Examiner.*